US006180753B1

(12) United States Patent
Amagai et al.

(10) Patent No.: US 6,180,753 B1
(45) Date of Patent: Jan. 30, 2001

(54) PROCESS FOR TREATING A COMPOUND HAVING EPITHIO STRUCTURES FOR DISPOSAL

(75) Inventors: Akikazu Amagai; Motoharu Takeuchi, both of Tokyo (JP)

(73) Assignee: Mitsubishi Gas Chemical Company, Inc., Tokyo (JP)

( * ) Notice: Under 35 U.S.C. 154(b), the term of this patent shall be extended for 0 days.

(21) Appl. No.: 09/372,950

(22) Filed: Aug. 12, 1999

(30) Foreign Application Priority Data

Aug. 17, 1998 (JP) ........................................ 10-230690

(51) Int. Cl.[7] .......................... C08G 75/00; C08J 11/04

(52) U.S. Cl. ...................... 528/373; 528/374; 528/377; 528/486; 528/495; 523/427; 523/428; 521/43; 521/44

(58) Field of Search ...................... 549/90, 1; 528/373, 528/374, 377, 486, 495; 523/427, 428; 521/43, 44

(56) References Cited

U.S. PATENT DOCUMENTS 3,378,522 4/1968 Martin .
5,807,975 * 9/1998 Amagi et al. ........................ 528/373
5,945,504 * 8/1999 Amagi et al. ........................ 528/373

FOREIGN PATENT DOCUMENTS 0 198 949 10/1986 (EP) .

OTHER PUBLICATIONS

Chemical Abstracts, vol. 76, No. 24, Jun. 12, 1972, Columbus, Ohio, Abstract No. 144767, Inazu, Kunihei et al., "2.alpha.,3.alpha.–Epithio–5.alpha.–androstan–17.beta.–ol and related compounds. XIX. Degradation of 2.alpha., 3.alpha.–epithio–5.alpha.–androstan–17.beta.–yl 1–methoxy–cyclopentyl ether in aqueous dioxane", XP002118310, Shionogi Kenkyusho Nempo (1971) ,No. 21, 88–94, 1971.

* cited by examiner

*Primary Examiner*—Duc Truong
(74) *Attorney, Agent, or Firm*—Frishauf, Holtz, Goodman, Langer & Chick, P.C.

(57) ABSTRACT

An acidic substance is added to a mixture containing a compound having epithio structures and a catalyst for curing the compound and the mixture is solidified.

The mixture containing a compound having epithio structures and a catalyst for curing the compound can be mildly solidified for disposal.

3 Claims, No Drawings

PROCESS FOR TREATING A COMPOUND HAVING EPITHIO STRUCTURES FOR DISPOSAL

BACKGROUND OF THE INVENTION

1. Field of the Invention

The present invention relates to a process for treating a compound having epithio structure for disposal, and more particularly to a process for treating for disposal an unused portion of a mixture comprising a compound having epithio structures and a catalyst for curing the compound obtained in a process comprising casting and polymerizing the mixture to produce an optical material, such as a plastic lens, a prism, an optical fiber, an information recording substrate and a filter.

2. Description of the Related Arts

The present inventors have discovered novel compounds having epithio structures which provide optical materials having useful properties as optical materials, i.e., a small thickness, a small chromatic aberration, a refractive index of 1.7 or more and an Abbe number of 35 or more as described in the specifications of patent application for these compounds (Japanese Patent Application Laid-Open No. Heisei 9(1997)-110979 and Japanese Patent Application No. Heisei 8(1996)-5797). These compounds having epithio structures and compounds having epithio structures which are similar to these compounds (hereinafter, both referred to as compounds having epithio structures) show large reactivity in the presence of a curing catalyst. However, no process for mildly solidifying an unused portion of these compounds for disposal have been developed. Compositions containing a compound having episufide structures also show large reactivity in the presence of a curing catalyst. For example, when such compositions are left standing in a completely adiabatic system, abnormal polymerization takes place to generate a large amount of heat and to form bubbles and fumes. Therefore, to dispose these compounds and compositions, the compounds and the compositions cannot be left standing but must be divided into small portions and kept under control at a low temperature. Disposal in a large amount has been actually impossible. Moreover, compositions containing a compound having epithio groups contain a large amount of sulfur and there is the possibility that toxic gases such as carbon monoxide, sulfur oxide and hydrogen sulfide are generated in the abnormal polymerization. Thus, development of a process for mildly solidifying these compositions for disposal has been desired.

SUMMARY OF THE INVENTION

An object of the present invention is to provide a process for treating for disposal an unused portion of a mixture comprising a compound having epithio structures represented by formula (1) shown below and a catalyst for curing the compound obtained in a process comprising casting and polymerizing the mixture to produce an optical material, wherein the portion of the mixture is solidified mildly for disposal.

As the result of intensive studies by the present inventors to develop the process for treating the above compound having epithio structures, it was found that the compound having epithio structures represented by formula (1) shown below can be mildly solidified when an acidic substance is added to a mixture containing the compound and a catalyst for curing the compound. The present invention was completed on the basis of this knowledge.

The present invention provides:

(1) A process for treating a compound having epithio structures for disposal which comprises adding an acidic substance to a portion for disposal of a mixture comprising the compound and a catalyst for curing the compound and solidifying the portion, the portion being obtained in a process comprising casting and polymerizing the mixture to produce an optical material and the epithio structure being represented by following formula (1):

(1)

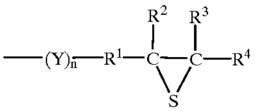

wherein $R^1$ represents a hydrocarbon group having 1 to 10 carbon atoms, $R^2$, $R^3$ and $R^4$ each represents hydrogen atom or a hydrocarbon group having 1 to 10 carbon atoms, Y represents S or O and n represents 0 or 1;

(2) A process described in (1), wherein the acidic substance is an acidic organic compound; and (3) A process described in (1), wherein the acidic substance is a compound having a phenolic hydroxyl group.

DESCRIPTION OF THE PREFERRED EMBODIMENTS

As the compound having epithio structures represented by formula (1) used in the present invention, compounds having two or more structures represented by formula (1) are preferable. Examples of the compound having epithio structures represented by formula (1) include the following compounds:

(A) Organic compounds having epithio groups (B) Organic compounds having epithioalkyloxy groups (C) Organic compounds having epithioalkylthio groups Organic compounds (A), (B) and (C) have a chain backbone structure, an alicyclic backbone structure, an aromatic backbone structure or a heterocyclic backbone structure having nitrogen atom, oxygen atom or sulfur atom. The organic compounds may have epithio group, epithioalkyloxy groups and epithioalkylthio groups in one molecule. The organic compound may also have sulfide linkages, ether linkages, sulfone linkages, ketone linkages, ester linkages, amide linkages or urethane linkages.

Preferable examples of the organic compound having epithio groups of compound (A) include compounds obtained by replacing one or more epoxy groups in compounds having epoxy groups (not glycidyl groups) with epithio groups. Specific examples of the above compound include:

Organic compounds having a chain aliphatic backbone structure such as 1,1-bis(epithioethyl)methane, 1-(epithioethyl)-1-(β-epithiopropyl)methane, 1,1-bis(β-epithiopropyl)methane, 1-(epithioethyl)-1-(β-epithiopropyl) ethane, 1,2-bis(β-epithiopropyl)ethane, 1-(epithioethyl)-3-(β-epithiopropyl)butane, 1,3-bis(β-epithiopropyl)propane, 1-(epithioethyl)-4-(β-epithiopropyl)pentane, 1,4-bis(β-epithiopropyl)butane, 1-(epithioethyl)-5-(β-epithiopropyl) hexane, 1-(epithioethyl)-2-(γ-epithiobutylthio)ethane, 1-(epithioethyl)-2-[2-(γ-epithiobutylthio)ethylthio]ethane, tetrakis(β-epithiopropyl)methane, 1,1,1-tris(β-epithiopropyl)propane, 1,3-bis(β-epithiopropyl)-1-(β-epithiopropyl)-2-thiapropane and 1,5-bis(β-epithiopropyl)-2,4-bis(β-epithiopropyl)-3-thiapentane;

Organic compounds having an alicyclic backbone structure such as 1,3- and 1,4-bis(epithoethyl)cyclohexanes, 1,3- and 1,4-bis(β-epithiopropyl)cyclohexanes, bis[4-(epithioethyl)cyclohexyl]methane, bis[4-(β-epithiopropyl) cyclohexyl]methane, 2,2-bis[4-(epithioethyl)cyclohexyl]-propane, 2,2-bis[4-(β-epithiopropyl)cyclohexyl]propane, bis[4-(β-epithiopropyl)cyclohexyl]sulfide, bis[4-(epithioethyl)cyclohexyl]sulfide, 2,5-bis-(epithioethyl)-1,4-dithiane, 2,5-bis(β-epithiopropyl)-1,4-dithiane, 4-epithioethyl-1,2-cyclohexene sulfide and 4-epoxy-1,2-cyclohexene sulfide;

Organic compounds having an aromatic backbone structure such as 1,3- and 1,4-bis(epithioethyl)benzenes, 1,3- and 1,4-bis(β-epithiopropyl)-benzenes, bis[4-(epithoethyl) phenyl]methane, bis[4-(β-epithiopropyl)-phenyl]methane, 2,2-bis[4-(epithioethyl)phenyl]propane, 2,2-bis[4-(β-epithiopropyl)phenyl]propane, bis[4-(epithioethyl)phenyl] sulfide, bis[4-(β-epithiopropyl)phenyl]sulfide, bis[4-(epithioethyl)phenyl]sulfone, bis[4-(β-epithiopropyl) phenyl]sulfone, 4,4'-bis(epithioethyl)biphenyl and the like compounds and 4,4'-bis(β-epithiopropyl)biphenyl and the like compounds; and Compounds obtained by replacing at least one hydrogen atom of the epithio group with methyl group.

Preferable examples of the organic compound having epithioalkyloxy groups of compound (B) include compounds obtained by replacing one or more glycidyl groups in epoxy compounds derived from an epihalohydrin with epithioalkyloxy groups (thioglycidyl groups). Specific examples of the above epoxy compound include epoxy compounds derived from phenols which are produced by condensation of epihalohydrins with polyhydric phenols such as hydroquinone, catechol, resorcinol, bisphenol A, bisphenol F, bisphenol sulfone, bisphenol ether, bisphenol sulfide, halogenated bisphenol A and novolak resins; epoxy compounds derived from alcohols which are produced by condensation of epihalohydrins with polyhydric alcohols such as ethylene glycol, diethylene glycol, triethylene glycol, polyethylene glycol, propylene glycol, dipropylene glycol, polypropylene glycol, 1,3-propanediol, 1,4-butanediol, 1,6-hexanediol, neopentyl glycol, glycerol, trimethylolpropane trimethacrylate, pentaerythritol, 1,3- and 1,4-cyclohexanediols, 1,3- and 1,4-cyclohexanedimethanols, hydrogenated bisphenol A, adducts of ethylene oxide and bisphenol A and adducts of propylene oxide and bisphenol A; epoxy compounds of glycidyl esters which are produced by condensation of epihalohydrins with polybasic carboxylic acid compounds such as adipic acid, sebacic acid, dodecanedicarboxylic acid, dimer acid, phthalic acid, isophthalic acid, terephthalic acid, tetrahydrophthalic acid, methyltetrahydrophthalic acid, hexahydrophthalic acid, hexahydroisophthalic acid, hexahydroterephthalic acid, HET acid, nadic acid, maleic acid, succinic acid, fumaric acid, trimellitic acid, benzenetetracarboxylic acid, benzophenonetetracarboxylic acid, naphthalenedicarboxylic acid and diphenyldicarboxylic acid; epoxy compounds derived from amines which are produced by condensation of epihalohydrins with primary amines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, bis(3-aminopropyl)ether, 1,2-bis(3-aminopropoxy)ethane, 1,3-bis(3-aminopropoxy)-2,2'-dimethylpropane, 1,2-, 1,3- and 1,4-bisaminocyclohexanes, 1,3- and 1,4-bisaminomethylcyclohexanes, 1,3- and 1,4-bisaminoethylcyclohexanes, 1,3- and 1,4-bisaminopropylcyclohexanes, hydrogenated 4,4'-diaminodiphenylmethane, isophoronediamine, 1,4-bisaminopropylpiperadine, m- and p-phenylenediamines, 2,4- and 2,6-tolylenediamines, m- and p-xylylenediamines, 1,5- and 2,6-naphthalenediamines, 4,4'-diaminodiphenylmethane, 4,4'-diaminodiphenyl ether and 2,2-(4,4'-diaminodiphenyl)propane; epoxy compounds derived from amines which are produced by condensation of epihalohydrins with secondary amines such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethyl-ethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperadine, 2-methylpiperadine, 2,5- and 2,6-dimethylpiperadines, homopiperadine, 1,1-di(4-piperadyl)methane, 1,2-di(4-piperidyl)ethane, 1,3-di(4-piperidyl)propane and 1,4-di(4-piperidyl)-butane; and epoxy compounds of urethane produced from the above polyhydric alcohols, the above phenols, diisocyanates and glycidol.

More specific examples of compound (B) include:

Organic compounds having a chain aliphatic backbone structure such as bis(β-epithiopropyl) ether, bis(β-epithiopropyloxy)methane, 1,2-bis(β-epithiopropyloxy) ethane, 1,3-bis(β-epithiopropyloxy)propane, 1,2-bis(β-epithiopropyloxy)propane, 1-(β-epithiopropyloxy)-2-(β-epithiopropyloxymethyl)propane, 1,4-bis(β-epithiopropyloxy)butane, 1,3-bis(β-epithiopropyloxy) butane, 1-(β-epithiopropyloxy)-3-(β-epithiopropyloxymethyl)butane, 1,5-bis(β-epithiopropyloxy)pentane, 1-(β-epithiopropyloxy)-4-(β-epithiopropyloxymethyl)pentane, 1,6-bis(β-epithiopropyloxy)hexane, 1-(β-epithiopropyloxy)-5-(β-epithiopropyloxymethyl)hexane, 1-(β-epithiopropyloxy)-2-[(2-β-epithiopropyloxyethyl)oxy]ethane, 1-(β-epithiopropyloxy)-2-[[2-(2-β-epithiopropyloxyethyl) oxyethyl]oxy]ethane, tetrakis-(β-epithiopropyloxymethyl) methane, 1,1,1-tris(β-epithiopropyloxymethyl)-propane, 1,5-bis(β-epithiopropyloxy)-2-(β-epithiopropyloxymethyl)-3-thiapentane, 1,5-bis(β-epithiopropyloxy)-2,4-bis(β-epithiopropyloxymethyl)-3-thiapentane, 1-(β-epithiopropyloxy)-2,2-bis(β-epithiopropyloxymethyl)-4-thiahexane, 1,5,6-tris(β-epithiopropyloxy)-4-(β-epithiopropyloxymethyl)-3-thiahexane, 1,8-bis(β-epithiopropyloxy)-4-(β-epithiopropyloxymethyl)-3,6-dithiaoctane, 1,8-bis(β-epithiopropyloxy)-4,5-bis(β-epithiopropyloxymethyl)-3,6-dithiaoctane, 1,8-bis(β-epithiopropyloxy)-4,4-bis (β-epithiopropyloxymethyl)-3,6-dithiaoctane, 1,8-bis((β-epithiopropyloxy )-2,4,5-tris((β-epithiopropyloxymethyl)-3,6-dithiaoctane, 1,8-bis(β-epithiopropyloxy)-2,5-bis(β-epithiopropyloxymethyl)-3,6-dithiaoctane, 1,9-bis(β-epithiopropyloxy)-5-(β-epithiopropyloxymethyl)-5-[(2-β-epithiopropyloxyethyl) oxymethyl]-3,7-dithianonane, 1,10-bis(β-epithiopropyloxy)-5,6-bis[(2-β-epithiopropyloxyethyl) oxy]-3,6,9-trithiadecane, 1,11-bis(β-epithiopropyloxy)-4,8-bis(β-epithiopropyloxymethyl)-3,6,9-trithiaundecane, 1,11-bis(β-epithiopropyloxy)-5,7-bis(β-epithiopropyloxymethyl)-3,6,9-trithiaundecane, 1,11-bis(β-epithiopropyloxy)-5,7-[(2-β-epithiopropyloxyethyl)-oxymethyl]-3,6,9-trithiaundecane and 1,11-bis(β-epithiopropyloxy)-4,7-bis(β-epithiopropyloxymethyl)-3,6,9-trithiaundecane;

Organic compounds having an alicyclic backbone structure such as 1,3- and 1,4-bis(β-epithiopropyloxy) cyclohexanes, 1,3- and 1,4-bis(β-epithiopropyloxymethyl) cyclohexanes, bis[4-(β-epithiopropyloxy)-cyclohexyl] methane, 2,2-bis[4-(β-epithiopropyloxy)cyclohexyl] propane, bis[4-(β-epithiopropyloxy)cyclohexyl]sulfide, 2,5-bis(β-epithiopropyloxymethyl)-1,4-dithiane and 2,5-bis(β-epithiopropyloxyethyloxymethyl)-1,4-dithiane;

Organic compounds having an aromatic backbone structure such as 1,3- and 1,4-bis(β-epithiopropyloxy)benzenes, 1,3- and 1,4-bis(β-epithiopropyloxymethyl)benzenes, bis[4-(β-epithiopropyloxy)phenyl]methane, 2,2-bis[4-(β-epithiopropyloxy)phenyl]propane, bis[4-(β-epithiopropyloxy)phenyl]sulfide, bis[4-(β-epithiopropyloxy)phenyl]sulfone and 4,4'-bis(β-epithiopropyloxy)biphenyl; and Compounds obtained by replacing at least one hydrogen atom in the epithio group of the above compounds with methyl group.

Preferable examples of the organic compound having epithioalkylthio groups of compound (C) include compounds obtained by replacing one or more epoxyalkylthio groups (specifically, (β-epoxypropylthio groups) in epoxy compounds derived from a compound having mercapto group and an epihalohydrin with epithioalkylthio groups. Specific examples of the above compound include:

Organic compounds having a chain aliphatic backbone structure such as bis(β-epithiopropyl) sulfide, bis(β-epithiopropylthio)methane, 1,2-bis(β-epithiopropylthio) ethane, 1,3-bis(,β-epithiopropylthio)propane, 1,2-bis(β-epithiopropylthio)propane, 1-(β-epithiopropylthio)-2-(β-epithiopropylthiomethyl)propane, 1,4-bis(β-epithiopropylthio)butane, 1,3-bis(β-epithiopropylthio) butane, 1-(β-epithiopropylthio)-3-(β-epithiopropylthiomethyl)butane, 1,5-bis(β-epithiopropylthio)pentane, 1-(β-epithiopropylthio)-4-(β-epithiopropylthiomethyl)pentane, 1,6-bis(β-epithiopropylthio)hexane, 1-(β-epithiopropylthio)-5-(β-epithiopropylthiomethyl)hexane, 1-(β-epithiopropylthio)-2-[(2-β-epithiopropylthioethyl)thio]ethane, 1-(β-epithiopropylthio)-2-[[2-(2-β-epithiopropylthioethyl) thioethyl]thio]ethane, tetrakis(β-epithiopropylthiomethyl) methane, 1,1,1-tris(β-epithiopropylthiomethyl)propane, 1,5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1-(β-epithiopropylthio)-2,2-bis(β-epithiopropylthiomethyl)-4-thiahexane, 1,5,6-tris(β-epithiopropylthio)-4-(β-epithiopropylthiomethyl)-3-thiahexane, 1,8-bis(β-epithiopropylthio)-4-(β-epithiopropylthiomethyl)-3,6-dithiaoctane, 1,8-bis(β-epithiopropylthio)-4,5-bis(-epithiopropylthiomethyl)-3,6-dithiaoctane, 1,8-bis(β-epithiopropylthio)-4,4-bis(β-epithiopropylthiomethyl)-3,6-dithiaoctane, 1,8-bis(β-epithiopropylthio)-2,4,5-tris(β-epithiopropylthiomethyl)-3,6-dithiaoctane, 1,8-bis(β-epithiopropylthio)-2,5-bis(β-epithiopropylthiomethyl)-3,6-dithiaoctane, 1,9-bis(β-epithiopropylthio)-5-(β-epithiopropylthiomethyl)-5-[(2-β-epithiopropylthioethyl) thiomethyl]-3,7-dithianonane, 1,10-bis(β-epithiopropylthio)-5,6-bis[(2-β-epithiopropylthioethyl) thio]-3,6,9-trithiadecane, 1,1 1-bis(β-epithiopropylthio)-4,8-bis(β-epithiopropylthiomethyl)-3,6,9-trithiaundecane, 1,11-bis(β-epithiopropylthio)-5,7-bis(β-epithiopropylthiomethyl)-3,6,9-trithiaundecane, 1,11-bis(β-epithiopropylthio)-5,7-[(2-β-epithiopropylthioethyl) thiomethyl]-3,6,9-trithiaundecane and 1,11-bis(β-epithiopropylthio)-4,7-bis(β-epithiopropylthiomethyl)-3,6,9-trithiaundecane;

Chain compounds having an ester group and an epithioalkylthio group such as tetra[2-(β-epithiopropylthio) acetylmethyl]methane, 1,1,1-tri[2-(β-epithiopropylthio) acetylmethyl]propane, tetra[2-(β-epithiopropylthiomethyl) acetylmethyl]methane and 1,1,1-tri[2-(β-epithiopropylthiomethyl)acetylmethyl]propane;

Compounds having an alicyclic backbone structure such as 1,3- and 1,4-bis((β-epithiopropylthio)cyclohexanes, 1,3- and 1,4-bis(β-epithiopropyl-thiomethyl)cyclohexanes, bis [4-(β-epithiopropylthio)cyclohexyl]methane, 2,2-bis[4-(β-epithiopropylthio)cyclohexyl]propane, bis[4-(β-epithiopropylthio)cyclohexyl]sulfide, 2,5-bis(β-epithiopropylthiomethyl)-1,4-dithiane and 2,5-bis(β-epithiopropylthioethylthiomethyl)-1,4-dithiane;

Compounds having an aromatic backbone structure such as 1,3- and 1,4-bis(β-epithiopropylthio)benzenes, 1,3- and 1,4-bis(β-epithiopropylthiomethyl)benzenes, bis[4-(β-epithiopropylthio)phenyl]methane, 2,2-bis[4-(β-epithiopropylthio)phenyl]propane, bis[4-(β-epithiopropylthio)phenyl]sulfide, bis[4-(β-epithiopropylthio)phenyl]sulfone and 4,4'-bis(β-epithiopropylthio)biphenyl; and Compounds obtained by replacing at least one hydrogen atom in the epithio group of the above compounds with methyl group.

Examples of compounds (A) to (C) also include organic compounds having unsaturated groups. Specific examples of such compounds include vinylphenyl thioglycidyl ether, vinylbenzyl thioglycidyl ether, thioglycidyl methacrylate, thioglycidyl acrylate and allyl thioglycidyl ether.

Further examples of the compounds having epithio group include compounds such as ethylene sulfide, propylene sulfide and thioglycidol; thioglycidyl esters of monocarboxylic acids such as acetic acid, propionic acid and benzoic acid; and thioglycidyl ethers such as methyl thioglycidyl ether, ethyl thioglycidyl ether, propyl thioglycidyl ether and butyl thioglycidyl ether.

Among the above compounds, the organic compounds having epithioalkyloxy groups described as examples of compound (B) and the organic compounds having epithioalkylthio groups described as examples of compound (C) are preferable for optical materials. The organic compounds having epithioalkylthio groups described as examples of compound (C) are more preferable. Examples of still more preferable compounds include chain compounds, branched compounds, alicyclic compounds and aromatic compounds having β-epithiopropylthio groups which are described above as the examples.

Examples of the curing catalyst used for producing an optical material in the present invention include amines, phosphines, mineral acids, Lewis acids, organic acids, silicic acids and tetrafluoroboric acid.

(1) Examples of the amine used as the curing catalyst include primary monoamines such as ethylamine, n-propylamine, sec-propylamine, n-butylamine, sec-butylamine, isobutylamine, tert-butylamine, pentylamine, hexylamine, heptylamine, octylamine, decylamine, laurylamine, myristylamine, 1,2-dimethylhexylamine, 3-pentylamine, 2-ethylhexylamine, allylamine, aminoethanol, 1-aminopropanol, 2-aminopropanol, aminobutanol, aminopentanol, aminohexanol, 3-ethoxypropylamine, 3-propoxypropylamine, 3-isopropoxypropylamine, 3-butoxypropylamine, 3-isobutoxypropylamine, 3-(2-ethylhexyloxy)propylamine, aminocyclopentane, aminocyclohexane, aminonorbornene, aminomethylcyclohexane, aminobenzene, benzylamine, phenetylamine, α-phenylethylamine, naphthylamine and furfurylamine; primary polyamines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, dimethylaminopropylamine, diethylaminopropylamine, bis-(3-aminopropyl) ether, 1,2-bis-(3-aminopropoxy)ethane, 1,3-bis-(3-aminopropoxy)-2,2'-dimethylpropane, aminoethylethanolamine, 1,2-, 1,3- and 1,4-bisaminocyclohexanes, 1,3-and 1,4-bisaminomethylcyclohexanes, 1,3- and 1,4-bisaminoethylcyclohexanes, 1,3- and 1,4-bisaminopropylcyclohexanes, hydrogenated 4,4'-diaminodiphenylmethane, 2- and 4-aminopiperidines, 2- and 4-aminomethylpiperidines, 2- and 4-aminoethylpiperidines, N-aminoethylpiperidine, N-aminopropylpiperidine, N-aminoethylmorpholine, N-aminopropylmorpholine, isophoronediamine, menthanediamine, 1,4-bisaminopropylpiperadine, o-, m- and p-phenylenediamines, 2,4- and 2,6-tolylenediamines, 2,4-toluenediamine, m-aminobenzylamine, 4-chloro-o-phenylenediamine, tetrachloro-p-xylylenediamine, 4-methoxy-6-methyl-m-phenylenediamine, m- and p-xylylenediamines, 1,5- and 2,6-naphthalenediamines, benzidine, 4,4'-bis(o-toluidine), dianisidine, 4,4'-diaminodiphenylmethane, 2,2-(4,4'-diaminodiphenyl)propane, 4,4'-diaminodiphenyl ether, 4,4'-thiodianiline, 4,4'-diaminodiphenyl sulfone, 4,4'-diaminoditolyl sulfone, methylenebis(o-chloroaniline), 3,9-bis(3-aminopropyl)-2,4,8, 10-tetraoxaspiro[5,5]undecane, diethylenetriamine, iminobispropylamine, methyliminobispropylamine, bis(hexamethylene)-triamine, triethylenetetramine, tetraethylenepentamine, pentaethylene-hexamine, N-aminoethylpiperadine, N-aminopropylpiperadine, 1,4-bis(aminoethylpiperadine), 1,4-bis(aminopropylpiperadine), 2,6-diaminopyridine and bis(3,4-diaminophenyl) sulfone; secondary monoamines such as diethylamine, dipropylamine, di-n-butylamine, di-sec-butylamine, diisobutylamine, di-n-pentylamine, di-3-pentylamine, dihexylamine, dioctylamine, di(2-ethylhexyl) amine, methylhexylamine, diallylamine, pyrrolidine, piperidine, 2-, 3- and 4-picolines, 2,4-, 2,6- and 3,5-lupetidines, diphenylamine, N-methylaniline, N-ethylaniline, dibenzylamine, methylbenzylamine, dinaphthylamine, pyrrol, indoline, indole and morpholine; secondary polyamines such as N,N'-dimethylethylenediamine, N,N'-dimethyl-1,2-diaminopropane, N,N'-dimethy-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperadine, 2-methylpiperadine, 2,5- and 2,6-dimethylpiperadines, homopiperadine, 1,1-di(4-piperidyl)methane, 1,2-di(4-piperidyl)ethane, 1,3-di(4-piperidyl)-propane, 1,4-di(4-piperidyl)butane and tetramethylguanidine; tertiary amines such as trimethylamine, triethylamine, tri-n-propylamine, triisopropylamine, tri-1,2-dimethylpropylamine, tri-3-methoxypropylamine, tri-n-butylamine, triisobutylamine, tri-sec-butylamine, tri-n-pentylamine, tri-3-pentylamine, tri-n-hexylamine, tri-n-octylamine, tri-2-ethylhexylamine, tridodecylamine, trilaurylamine, dicyclohexylethylamine, cyclohexyldiethylamine, tricyclohexylamine, N,N-dimethylhexylamine, N-methyldihexylamine, N,N-dimethylcyclohexylamine, N-methyl-dicyclohexylamine, N,N-diethylethanolamine, N,N-dimethylethanolamine, N-ethyldiethanolamine, triethanolamine, tribenzylamine, N,N-dimethylbenzylamine, diethylbenzylamine, triphenylamine, N,N-dimethylamino-p-cresol, N,N-dimethylaminomethylphenol, 2-(N,N-dimethylaminomethyl)phenol, N,N-dimethylaniline, N,N-diethylaniline, pyridine, quinoline, N-methylmorpholine, N-methylpiperidine and 2-(2-dimethylaminoethoxy)-4-methyl-1,3,2-dioxabornane; tertiary polyamines such as tetramethylethylenediamine, pyrazine, N,N'-dimethylpiperadine, N,N'-bis((2-hydroxy)propyl) piperadine, hexamethylenetetramine, N,N,N',N'-tetramethyl-1,3-butaneamine, 2-dimethylamino-2-hydroxypropane, diethyaminoethanol, N,N,N-tris(3-dimethylaminopropyl)amine, 2,4,6-tris(N,N,N-dimethylaminomethyl)phenol and heptamethylisobiguanide; imidazoles such as imidazole, N-methylimidazole, 2-methylimidazole, 4-methylimidazole, N-ethylimidazole, 2-ethylimidazole, 4-ethylimidazole, N-butylimidazole, 2-butylimidazole, N-undecylimidazole, 2-undecylimidazole, N-phenylimidazole, 2-phenylimidazole, N-benzylimidazole, 2-benzylimidazole, 1-benzyl-2-methylimidazole, N-(2'-cyanoethyl)-2-methylimidazole, N-(2'-cycanoethyl)-2-undecylimidazole, N-(2'-cyanoethyl)-2-phenylimidazole, 3,3-bis-(2-ethyl-4-methylimidazolyl) methane, addition products of alkylimidazoles and isocyanuric acid and condensation products of alkylimidazoles and formaldehyde; and amidines such as 1,8-diazabicyclo-(5,4,0)undecene-7,1,5-diazabicyclo(4,3,0)nonene-5,6-dibutylamino-1,8-diazabicyclo(5,4,0)-undecene-7.

(2) Quaternary ammonium salts of the above amines with halogens, mineral acids, Lewis acids, organic acids, silicic acid and tetrafluoroboric acid can also be used.

(3) Complexes of the above amines with borane and boron trifluoride can also be used.

(4) Examples of the phosphine include trimethylphosphine, triethylphosphine, triisopropylphosphine, tri-n-butylphosphine, tri-n-hexylphosphine, tri-n-octylphosphine, tricyclohexylphosphine, triphenylphosphine, tribenzylphosphine, tris(2-methylphenyl)phosphine, tris(3-methylphenyl)phosphine, tris(4-methylphenyl)phosphine, tris-(diethylamino)phosphine, tris(4-methylphenyl) phosphine, dimethyl-phenylphosphine, diethylphenylphosphine, dicyclohexylphenylphosphine, ethyldiphenylphosphine, diphenylcyclohexylphosphine and chlorodiphenylphosphine.

(5) Examples of the mineral acid include hydrochloric acid, sulfuric acid, nitric acid, phosphoric acid and carbonic acid. Half-esters of these mineral acids can also be used.

(6) Examples of the Lewis acid include boron trifluoride and boron trifluoride etherates.

(7) Organic acids and half-esters of organic acids can be used.

(8) Silicic acids and tetrafluoroboric acid can be used.

Among these compounds, primary monoamines, secondary monoamines, tertiary monoamines, tertiary polyamines, imidazoles, amidines, quaternary ammonium salts and phosphines are preferable because these compounds cause little coloring of the cured products when an optical material is produced. Secondary monoamines, tertiary monoamines, tertiary polyamines, imidazoles, amidines, quaternary ammonium salts and phosphines having one or less group which can react with the epithio group are more preferable. A single type or a mixture of two or more types of these compounds may be used.

The mixture containing the compound having epithio structures and a catalyst for curing the compound used in the present invention may comprise a compound having one or more functional groups which are reactive with the epithio group in formula (1), a compound having one or more functional groups which are reactive with the epithio group in formula (1) and one or more other homopolymerizable functional groups, a compound having one or more homopolymerizable functional groups or a compound having one homopolymerizable functional group which is reactive with the epithio group in formula (1).

Examples of the compound having one or more functional groups which are reactive with the epithio group in formula (1) include epoxy compounds and anhydrides of polybasic carboxylic acids.

Examples of the compound having one or more functional groups which are reactive with the epithio group in formula (1) and one or more other homopolymerizable functional groups include epoxy compounds and anhydrides of carboxylic acid, which have unsaturated groups such as methacryl group, acryl group, allyl group, vinyl group and aromatic vinyl groups.

Examples of the compound having one or more homopolymerizable functional group include compounds having unsaturated groups such as methacryl group, acryl group, allyl group, vinyl group and aromatic vinyl groups.

Specific examples of the compound having one or more functional groups which are reactive with the epithio group are as follows.

Specific examples of the epoxy compounds include the compounds described above as the examples of the epoxy compounds which provide the compounds having epithioalkyloxy groups.

Examples of the anhydrides of polybasic carboxylic acids include the compounds described above as the examples of the anhydrides of carboxylic acids which provide the epoxy compounds by the condensation with epihalohydrins.

Specific examples of the compound having one functional group which are reactive with the epithio group in formula (1) and one or more other homopolymerizable functional groups are as follows.

Examples of the epoxy compound having unsaturated groups include vinylphenyl glycidyl ether, vinylbenzyl glycidyl ether, glycidyl methacrylate, glycidyl acrylate and allyl glycidyl ether.

Specific examples of the compound having one or more homopolymerizable functional groups include compounds having a structure of an ester of acrylic acid or methacrylic acid and a mono- or polyhydric alcohol such as methyl acrylate, methyl methacrylate, ethyl acrylate, ethyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, polyethylene glycol diacrylate, polyethylene glycol dimethacrylate, 1,3-butylene glycol diacrylate, 1,3-butylene glycol dimethacrylate, 1,6-hexanediol diacrylate, 1,6-hexanediol dimethacrylate, neopentyl glycol diacrylate, neopentyl glycol dimethacrylate, polypropylene glycol diacrylate, polypropylene glycol dimethacrylate, 2,2-bis[4-(acryloxyethoxy)phenyl]propane, 2,2-bis [4-(methacryloxyethoxy)-phenyl]propane, 2,2-bis[4-(acryloxy-diethoxy)-phenyl]propane, 2,2-bis[4-(methacryloxy-diethoxy)phenyl]propane, 2,2-bis[4-(acryloxy-polyethoxy)-phenyl]propane, 2,2-bis[4-(methacryloxy- polyethoxy)phenyl]propane, trimethylolpropane triacrylate, trimethylolpropane trimethacrylate, pentaerythritol tetraacrylate, pentaerythritol tetramethacrylate, bis(2,2,2-trimethylolethyl) ether hexaacrylate and bis(2,2,2-trimethylolethyl)ether hexamethacrylate; allyl compounds such as allyl sulfide, diallyl phthalate and diethylene glycol bisallylcarbonate; vinyl compounds such as acrolein, acrylonitrile and vinyl sulfide; and aromatic vinyl compounds such as styrene, α-methylstyrene, methylvinylbenzene, ethylvinylbenzene, α-chlorostyrene, chlorovinylbenzene, vinylbenzyl chloride, paradivinylbenzene and meta-divinylbenzene.

Preferable examples of the compound having one homopolymerizable functional group which is reactive with the epithio group include compounds having one epoxy group. Specific examples of such compounds include monoepoxy compounds such as ethylene oxide, propylene oxide and glycidol; glycidyl esters of monocarboxylic acids such as acetic acid, propionic acid and benzoic acid; and glycidyl ethers such as methyl glycidyl ether, ethyl glycidyl ether, propyl glycidyl ether and butyl glycidyl ether.

The compound having one or more functional groups which are reactive with the epithio group in formula (1) and the compound having one or more functional group described above and one or more other homopolymerizable functional groups can be cured by polymerization in the presence of a curing catalyst. As the curing catalyst, the amines, the phosphines and the acids described above can be used. Examples of the curing catalyst are the same as those described above.

When the compound having unsaturated groups is used, it is preferable that a radical polymerization initiator is used as the polymerization accelerator. Any compound forming a radical by heating or by irradiation of ultraviolet light or electron beams can be used as the radical polymerization initiator. Examples of the radical polymerization initiator include the following conventional polymerization catalysts used under heating: peroxides such as cumyl peroxyneodecanoate, diisopropyl peroxydicarbonate, diallyl peroxydicarbonate, di-n-propyl peroxy-dicarbonate, dimyristyl peroxydicarbonate, cumyl peroxyneohexanoate, tert-hexyl peroxyneodecanoate, tert-butyl peroxyneodecanoate, tert-hexyl peroxyneohexanoate, tert-butyl peroxyneohexanoate, 2,4-dichlorobenzoyl peroxide, benzoyl peroxide, dicumyl peroxide and di-tert-butyl peroxide; hydroperoxides such as cumene hydroperoxide and tert-butyl hydroperoxide; azo compounds such as 2,2'-azobis(4-methoxy-2,4-dimethylvaleronitrile), 2,2'-azobis(2-cyclopropylpropionitrile), 2,2'-azobis-(2,4-dimethylvaleronitrile), 2,2'-azobisisobutyronitrile, 2,2'-azobis(2-methylbutyronitrile), 1,1'-azobis(cyclohexane-1-carbonitrile), 1-[(1-cyano-1-methylethyl)azo]formamide, 2-phenylazo-4-methoxy-2,4-dimethylvaleronitrile, 2,2'-azobis(2-methylpropane) and 2,2'-azobis(2,4,4-trimethylpentane); and conventional photopolymerization catalysts such as benzophenone and benzoin benzoinmethyl ether. Among these compounds, peroxides, hydroperoxides and azo compounds are preferable and peroxides and azo compounds are more preferable. Most preferable examples include azo compounds such as 2,2'-azobis(4-methoxy-2,4-dimethylvaleronitrile), 2,2'-azobis(2-cyclopropylpropionitrile), 2,2'-azobis (2,4-dimethylvaleronitrile), 2,2'-azobisisobutyronitrile, 2,2'-azobis(2-methylbutyronitrile), 1,1'-azobis(cyclohexane-1-carbonitrile), 1-[(1-cyano-1-methylethyl)azo]formamide, 2-phenylazo-4-methoxy-2,4-dimethylvaleronitrile, 2,2'-azobis(2-methylpropane) and 2,2'-azobis(2,4,4-trimethylpentane. The above compounds may be used as a mixture of the compounds.

The radical polymerization initiator is not the curing catalyst described above. The amount used is different depending on the components of the mixture and the process for curing. The amount is generally in the range of 0.01 to 5.0% by weight and preferably in the range of 0.1 to 2.0% by weight of the total amount of the mixture.

In the process for producing an optical material, it is, of course, possible that conventional additives such as antioxidants, ultraviolet light absorbents and photostabilizers are added to improve the practical properties of the obtained materials. It is also possible that conventional external and/or internal adhesion improvers are used or added to prevent detachment of the material from the mold during polymerization. Examples of the internal adhesion improver include silane compounds such as 3-methacryloxypropyltrimethoxysilane, 3-glycidoxypropyltrimethoxysilane, N-(2-aminoethyl)-3-aminopropyltrimethoxysilane and 3-mercaptopropyltrimethoxysilane. The internal adhesion improver can be used in an amount of 0.0001 to 5 parts by weight per 100 parts by weight of the mixture of the present invention.

It is also possible that compounds having one or more SH groups is added to the mixture used in the present invention as an antioxidant component singly or in combination with conventional antioxidants to provide the cured mixture with a further improved antioxidation property. Examples of the compound having one or more SH groups include mercaptans, thiophenols and mercaptans and thiophenols having unsaturated groups such as vinyl group, aromatic vinyl groups, methacryl group, acryl group and ally group.

Specific examples of the mercaptan include monomercaptans such as methyl mercaptan, ethyl mercaptan, n-propyl mercaptan, n-butyl mercaptan, allyl mercaptan, n-hexyl mercaptan, n-octyl mercaptan, n-decyl mercaptan, n-dodecyl mercaptan, n-tetradecyl mercaptan, n-hexadecyl mercaptan, n-octadecyl mercaptan, cyclohexyl mercaptan, isopropyl mercaptan, tert-butyl mercaptan, tert-nonyl mercaptan, tert-dodecyl mercaptan, benzyl mercaptan, 4-chlorobenzyl mercaptan, methyl thioglycolate, ethyl thioglycolate, n-butyl thioglycolate, n-octyl thioglycolate, methyl (3-mercaptopropionate), ethyl (3-mercaptopropionate), 3-methoxybutyl (3-methylpropionate), n-butyl (3-mercaptpropionate), 2-ethylhexyl (3-mercaptopropionate) and n-octyl (3-mercaptopropionate); and polymercaptans such as methanedithiol, 1,2-dimercaptoethane, 1,2-dimercaptopropane, 2,2-dimercaptopropane, 1,3-dimercaptopropane, 1,2,3- trimercaptopropane, 1,4-dimercaptobutane, 1,6-dimercaptohexane, bis(2-mercaptoethyl) sulfide, 1,2-bis(2-mercapto-ethylthio) ethane, 1,5-dimercapto-3-oxapentane, 1,8-dimercapto-3,6-dioxaoctane, 2,2-dimethylpropane-1,3-dithiol, 3,4-dimethoxybutane-1,2-dithiol, 2-mercaptomethyl-1,3-dimercaptopropane, 2-mercaptomethyl-1,4-dimercaptobutane, 2-(2-mercaptoethylthio)-1,3-dimercaptopropane, 1,2-bis(2-mercaptoethylthio)-3-mercaptopropane, 1,1,1-tris(mercaptomethyl)-propane, tetrakis(mercaptomethyl)methane, ethylene glycol bis(2-mercaptoacetate), ethylene glycol bis(3-mercaptopropionate), 1,4-butanediol bis(2-mercaptoacetate), 1,4-butanediol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), 1,1-dimercaptocyclohexane, 1,4-dimercaptocyclohexane, 1,3-dimercaptocyclohexane, 1,2-dimercaptocyclohexane, 1,4-bis(mercaptomethyl)-cyclohexane, 1,3-bis-(mercaptomethyl)cyclohexane, 2,5-bis-(mercaptomethyl)-1,4-dithiane, 2,5-bis(2-mercaptoethyl)-1,4-dithiane, 2,5-bis(mercaptomethyl)-1-thiane, 2,5-bis(2-mercaptoethyl)-1-thiane, 1,4-bis (mercaptomethyl)benzene, 1,3-bis(mercaptomethyl) benzene, bis(4-mercaptophenyl) sulfide, bis(4-mercaptophenyl)ether, 2,2-bis(4-mercaptophenyl)propane, bis(4-mercaptomethylphenyl) sulfide, bis(4-mercaptomethylphenyl)ether, 2,2-bis(4-mercaptomethylphenyl)propane, 2,5-dimercapto-1,3,4-thiadiazole and 3,4-thiophenedithiol.

Specific examples of the thiophenol include thiophenol, 4-tertbutylthiophenol, 2-methylthiophenol, 3-methylthiophenol, 4-methylthiophenol, 1,2-dimercaptobenzene, 1,3-dimercaptobenzene and 1,4-dimercaptobenzene.

Specific examples of the mercaptans and thiophenols having unsaturated groups are as follows.

Specific examples of the mercaptan having unsaturated groups include allyl mercaptan, 2-vinylbenzyl mercaptan, 3-vinylbenzyl mercaptan and 4-vinylbenzyl mercaptan.

Specific examples of the thiophenol having unsaturated groups include 2-vinylthiophenol, 3-vinylthiophenol and 4-vinylthiophenol.

A single type or a combination of two or more types of the above compounds may be used. The above compounds can be used in an amount of 0.001 to 40 parts by weight per 100 parts by weight of the composition used in the present invention.

It is also possible that a compound having one or more active hydrogen atoms other than that of SH group is used to improve the properties such as the tint performance and strength. Examples of the active hydrogen atom include hydrogen atoms in hydroxyl group, carboxyl group and amide group and hydrogen atoms at the 2-position of 1,3-diketones, 1,3-dicarboxylic acids, esters of 1,3-dicarboxylic acids, 3-ketocarboxylic acids and esters of 3-ketocarboxylic acids. Examples of the compound having one or more active hydrogen atoms in one molecule include alcohols, phenols, mercaptoalcohols, hydroxythiophenols, carboxylic acids, mercaptocarboxylic acids, hydroxycarboxylic acids, amides, 1,3-diketones, 1,3-dicarboxylic acids, esters of 1,3-dicarboxylic acids, 3-ketocarboxylic acids, esters of 3-ketocarboxylic acids, and compounds having unsaturated groups such as alcohols, phenols, mercaptoalcohols, hydroxythiophenols, carboxylic acids, mercaptocarboxylic acids, hydroxycarboxylic acids, amides, 1,3-diketones, 1,3-dicarboxylic acids, esters of 1,3-dicarboxylic acids, 3-ketocarboxylic acids and esters of 3-ketocarboxylic acids having vinyl group, aromatic vinyl groups, methacryl group, acryl group and allyl group.

Examples of the alcohol include monohydric alcohols such as methanol, ethanol, n-propyl alcohol, isopropyl alcohol, n-butyl alcohol, isobutyl alcohol, sec-butyl alcohol, tert-butyl alcohol, n-pentyl alcohol, isopentyl alcohol, n-hexyl alcohol, n-heptyl alcohol, n-octyl alcohol, n-nonyl alcohol, n-decyl alcohol, n-dodecyl alcohol, cyclopentanol, cyclohexanol, 2-methylthioethanol, 2-ethylthioethanol, 2-(n-dodecylthio)ethanol and n-dodecyl hydroxyethyl sulfoxide; and polyhydric alcohols such as ethylene glycol, propylene glycol, 1,3-propanediol, diethylene glycol, triethylene glycol, polyethylene glycol, 1,3-butylene glycol, 1,6-hexanediol, neopentyl glycol, polypropylene glycol, glycerol, pentaerythritol monomethacrylate, pentaerythritol monoacrylate, pentaerythritol dimethacrylate, pentaerythritol diacrylate, 2,5-dimethyl-3-hexyne-2,5-diol, 2,5-dimethylhexane-2,5-diol, trimethylolpropane, pentaerythritol, hydrogenated bisphenol A, 2-hydroxyethyl isocyanurate and 2-hydroxyethyl cyanurate.

Examples of the phenol include phenol, o-cresol, m-cresol, p-cresol, catechol, resorcinol, hydroquinone, o-hydroxybenzaldehyde, m-hydroxybenzaldehyde, p-hydroxybenzaldehyde, bisphenol A, bisphenol F and bisphenol Z.

Examples of the mercaptoalcohol include 2-mercaptoethanol, 3-mercaptopropanol, 2-mercaptopropanol, 2-hydroxypropylmercaptan, 2-phenyl-2-mercaptoethanol, 2-phenyl-2-hydroxyethylmercaptan, 3-mercapto-1,2-propanediol, 2-mercapto-1,3-propanediol, 2,3-dimercaptopropanol, 1,3-dimercapto-2-propanol, 2,2-dimethylpropane-1,3-dithiol and glyceryl dithioglycolate.

Examples of the hydroxythiophenol include 2-hydroxythiophenol, 3-hydroxythiophenol and 4-hydroxythiophenol.

Examples of the carboxylic acid include formic acid, acetic acid, propionic acid, butyric acid, valeric acid, caproic acid, caprylic acid, methyl mercaptopropionate, oxalic acid, malonic acid, succinic acid, glutaric acid, adipic acid, cyclohexanecarboxylic acid, benzoic acid, o-toluic acid, m-toluic acid, p-toluic acid, 2-methoxybenzoic acid, 3-methoxybenzoic acid, phthalic acid, isophthalic acid, terephthalic acid, thiodipropionic acid and dithiodipropionic acid.

Examples of the mercaptocarboxylic acid include thioglycolic acid, 2-thiopropionic acid, 3-thiopropionic acid, thiolactic acid, mercaptosuccinic acid, thiomalic acid, N-(2-mercaptopropionyl)glycine, 2-mercaptobenzoic acid, 2-mercaptonicotinic acid, 3,3-dithioisobutyric acid, dithioglycolic acid, and dithiopropionic acid.

Examples of the hydroxycarboxylic acid include hydroxyacetic acid, α-hydroxypropionic acid, β-hydroxypropionic acid, α-hydroxybutyric acid, β-hydroxybutyric acid, γ-hydroxybutyric acid, salicylic acid, 3-hydroxybenzoic acid and 4-hydroxybenzoic acid.

Examples of the amide include formamide, N-methylformamide, acetamide, N-methylacetamide, phthalamide, isophthalamide, terephthalamide, benzamide, toluamide, 4-hydroxybenzamide and 3-hydroxybenzamide.

Examples of the 1,3-diketone include acetylacetone and cyclohexane-1,3,5-trione.

Examples of the 1,3-dicarboxylic acid and the ester thereof include malonic acid, 2-methylmalonic acid and mono- and diesters thereof.

Examples of the 3-ketocarboxylic acid and the ester thereof include acetoacetic acid and esters thereof.

Specific examples of the alcohol, phenol, mercaptan, thiophenol, mercaptoalcohol, carboxylic acid and amide having unsaturated groups are as follows.

Examples of the alcohol having unsaturated groups include monohydroxy compounds such as 2-hydroxyethyl methacrylate, 2-hydroxyethyl acrylate, 3-hydroxypropyl methacrylate, 3-hydroxypropyl acrylate, 2-hydroxypropyl methacrylate, 2-hydroxypropyl acrylate, 1,3-dimethacryloxy-2-propanol, 1,3-diacryloxy-2-propanol, 1-acryloxy-3-methacryloxy-2-propanol, pentaerythritol trimethacrylate, pentaerythritol triacrylate, bis(2,2,2-trimethylolethyl) ether pentamethacrylate, bis(2,2,2-trimethylolethyl) ether pentaacrylate, trimethylolpropane dimethacrylate, trimethylolpropane diacrylate, allyl alcohol, crotyl alcohol, methyl vinyl carbinol, cinnamyl alcohol, 4-vinylbenzyl alcohol, 3-vinylbenzyl alcohol, 2-(4-vinylbenzylthio)ethanol, 2-(3-vinylbenzylthio)ethanol, 1,3-bis(4-vinylbenzylthio)-2-propanol, 1,3-bis(3-vinylbenzylthio)-2-propanol, 2,3-bis(4- vinylbenzylthio)-l-propanol, 2,3-bis(3-vinylbenzylthio)-1-propanol, 3-phenoxy-2-hydroxypropyl acrylate, 2-hydroxyethyl isocyanurate bis(acrylate), 2-hydroxyethyl isocyanurate bis (methacrylate), 2-hydroxyethyl cyanurate bis(acrylate), 2-hydroxyethyl cyanurate bis(methacrylate), 3-methyl-1-butyn-3-ol, 3-methyl-1-pentyn-3-ol and propargyl alcohol; polyhydroxy compounds such as pentaerythritol dimethacrylate, pentaerythritol diacrylate, pentaerythritol monomethacrylate, pentaerythritol monoacrylate, trimethylolpropane monomethacrylate, trimethylolpropane monoacrylate, 2-hydroxyethyl isocyanurate mono(acrylate), 2-hydroxyethyl isocyanurate mono(methacrylate), 2-hydroxyethyl cyanurate mono(acrylate) and 2-hydroxyethyl cyanurate mono(methacrylate); and unsaturated polyhydroxy compounds formed by the addition reaction of acrylic acid or methacrylic acid such as 2,2-bis [4-(2-hydroxy-3-methacryloxypropoxy)-phenyl]propane.

Examples of the phenol having unsaturated groups include 2-vinylphenol, 3-vinylphenol and 4-vinylphenol.

Examples of the mercaptoalcohol having unsaturated groups include 2-(4-vinylbenzylthio)-2-mercaptoethanol and 2-(3-vinylbenzylthio)-2-mercaptoethanol.

Examples of the carboxylic acid having unsaturated groups include acrylic acid, methacrylic acid, crotonic acid, monohydroxyethyl acrylate phthalate, maleic acid, fumaric acid, monoallyl phthalate and cinnamic acid.

Examples of the amide having unsaturated groups include amides of α,β-unsaturated carboxylic acids such as acrylic acid, methacrylic acid, maleic acid, maleic anhydride and fumaric acid; and N-vinylformamide.

From the standpoint of heat resistance, preferable examples of the above compounds include mercaptoalcohols, hydroxythiophenols and alcohols having unsaturated groups.

A single type or a mixture of two or more types of the above compounds may be used. The above compounds can be used in an amount of 0.01 to 40 parts by weight per 100 parts by weight of the mixture in the present invention.

The acidic substance added to the mixture comprising the compound having epithio structures represented by formula (1) and the catalyst for curing the compound to mildly solidify the mixture is a fluid containing 0.1% or more of acidic inorganic and/or organic compounds. Specifically, the acidic substance is a fluid prepared by dissolving or dispersing acidic inorganic and/or organic compounds in an amount of 0.1% or more in water, an organic solvent or a mixture of water and an organic solvent or inorganic and/or organic compounds without any media. Examples of the acidic inorganic and/or organic compound are shown in the following.

Examples of the inorganic compound include nitric acid, hydrochloric acid, perchloric acid, hypochlorous acid, chlorine dioxide, hydrofluoric acid, sulfuric acid, fuming sulfuric acid, boric acid, arsenic acid, arsenous acid, pyroarsenic acid, phosphoric acid, phosphorous acid, hypophosphorous acid, phosphorus oxychloride, phosphorus oxybromide, phosphorus sulfide, phosphorus trichloride, phosphorus tribromide, phosphorus pentachloride, cyanic acid, chromic acid, nitric anhydride, sulfuric anhydride, boron oxide, arsenic pentaoxide, phosphorus pentaoxide, chromic anhydride, sulfuryl chloride, silica gel and silica alumina.

Examples of the organic compound include carboxylic acids such as formic acid, acetic acid, propionic acid, butyric acid, valeric acid, caproic acid, capric acid, naphthenic acid, methyl mercaptopropionate, oxalic acid, malonic acid, succinic acid, glutaric acid, adipic acid, maleic acid, cyclohexanecarboxylic acid, benzoic acid, phenylacetic acid, o-toluic acid, m-toluic acid, p-toluic acid, salicylic acid, 2-methoxybenzoic acid, 3-methoxybenzoic acid, benzoylbenzoic acid, phthalic acid, isophthalic acid, terephthalic acid, benzylic acid, a-naphthalenecarboxylic acid, β-naphthalenecarboxylic acid, thiodipropionic acid, dithiodipropionic acid acetic acid, peracetic acid, thioacetic acid, tartaric acid, maleic anhydride, benzoic anhydride, phthalic anhydride, trimellitic anhydride and pyromellitic anhydride; organophosphorus compounds such as phosphoric acids such as mono-, di- and trimethyl phosphates, mono-, di- and triethyl phosphates, mono-, di- and triisobutyl phosphates, mono-, di- and tributyl phosphates and mono-, di- and trilauryl phosphates, phosphites corresponding to the above phosphates and dialkyl dithiophosphates such as methyl dithiophosphate; phenols such as phenol, catechol, t-butylcatechol, 2,6-di-t-butylcresol, 2,6-di-t-butylethylphenol, resorcinol, hydroquinone, phloroglucinol, pyrogallol, cresol, ethylphenol, butylphenol, nonylphenol, hydroxyphenylacetic acid, hydroxyphenylpropionic acid, hydroxyphenylacetamide, methyl hydroxyphenylacetate, hydrophenetyl alcohol, hydroxyphenetylamine, hydroxybenzaldehyde, phenylphenol, bisphenol A, 2,2'-methylene-bis(4-methyl-6-t-butylphenol), bisphenol F, bisphenol S, α-naphthol, β-naphthol, aminophenol, chlorophenol and 2,4,6-trichlorophenol; sulfonic acids such as methanesulfonic acid, ethanesulfonic acid, butanesulfonic acid, dodecanesulfonic acid, benzenesulfonic acid, o-toluenesulfonic acid, m-toluenesulfonic acid, p-toluenesulfonic acid, ethylbenzenesulfonic acid, butylbenzenesulfonic acid, dodecylbenzenesulfonic acid, p-phenolsulfonic acid, o-cresolsulfonic acid, metanylic acid, sulfanilic acid, 4B-acid, diaminostilbenesulfonic acid, biphenylsulfonic acid, α- naphthalenesulfonic acid, β-naphthalenesulfonic acid, peri acid, Laurent's acid and phenyl J-acid; mercaptans which are described as the examples of the compounds having one or more SH groups used as the antioxidant; benzensulfinic acid; and toluenesulfinic acid. A plurality of types of the acidic inorganic compounds and the acidic organic compounds may be used in combination.

Among the above compounds, acidic organic compounds are preferable and monohydric and dihydric phenols are more preferable. The amount can be changed as desired depending on the acid strength of the acidic substance. The acidic substance may be added in an amount of 0.01 to 100 parts by weight per 100 parts by weight of the mixture containing the compound having epithio structures represented by formula (1) and the catalyst for curing the compound.

An optical material is produced by mixing the main materials and the auxiliary materials, subsequently casting the obtained mixture into a mold and curing the mixture. An unused portion of this mixture containing the compound having epithio structures represented by formula (1) and the catalyst for curing the compound is disposed as a waste material. This portion is treated in accordance with the process of the present invention. The acidic substance is added to the unused portion of the mixture to solidify the portion for disposal. This process is specifically described in the following:

The temperature in the addition of the acidic substance is not particularly limited as long as the compound having epithio structures represented by formula (1) is not polymerized rapidly and can be mixed well with the acidic substance. Specifically, the acidic substance can be added at a temperature of −50 to 100° C. It is preferable that the mixture obtained after the addition of the acidic substance is made as uniform as possible. When the mixture is not sufficiently uniform, there is the possibility that portions of abnormal solidification or insufficient solidification are formed in the mixture. The mixture obtained after the addition can be solidified by simply leaving the mixture at a suitable temperature. The temperature of solidification may be different depending on the type and the amount of the acidic substance, the total amount of the monomer and the amount of heat removed from the solidified system. In general, the mixture can be solidified at a temperature in the range of −50 to 100° C. It is preferable that the mixture is solidified at a temperature of 50° C. or lower when safety with respect to abnormal reactions is considered and 0° C. or higher when economy, i.e., the time required for solidification, is considered. In other words, the temperature is preferably in the range of 0 to 50° C. It is preferable that the temperature is kept constant after the acidic substance is added until the solidification is completed. However, the temperature may be changed within the above range.

To summarize the advantage of the invention, a mixture containing a compound having an epithio structure represented by formula (1) and a catalyst for curing the compound can be solidified mildly for disposal in accordance with the process of the present invention in which the mixture is solidified by addition of an acidic substance. Thus, it is not necessary that the portion of the mixture unused in the casting and polymerization is divided into small portions and kept at a low temperature before the mixture is solidified. A large amount of the compound having epithio structures represented by formula (1) can be solidified.

EXAMPLE

The present invention will be described with reference to examples in the following. However, the present invention is not limited to the examples.

Example 1

To 100 parts by weight of trimethylolpropane tris(β-epithiopropyl-thioacetate), 0.3 parts by weight of 2-diethylaminoethanol as the catalyst was mixed and the mixture was stirred at the room temperature to form a homogeneous liquid. The obtained liquid was cast into a mold and polymerized. When the liquid was cast, a portion of the homogeneous liquid overflowed the mold in an amount corresponding to 1 kg of trimethylolpropane tris(β-epithiopropylthioacetate) was taken as a sample of the unused material. To the obtained sample of the unused material, 75 g of phenol was added and mixed with the material homogeneously. The prepared mixture was left standing at 30° C. in an oven while the temperature of the mixture was kept being measured. After 4 days, the mixture solidified without being colored. The maximum increase in the temperature during the solidification was as small as 5° C. The results are shown in Table 1.

Example 2

To 1 kg of 1,2-bis(β-epithiopropylthio)propane, 3 g of 2-diethylaminoethanol as the catalyst was mixed in a beaker and the mixture was stirred at the room temperature to form a homogeneous liquid. To the obtained liquid, 50 g of phenol and 25 g of cresol were added and mixed with the liquid homogeneously. The prepared mixture was left standing at 30° C. in an oven while the temperature of the mixture was kept being measured. The results are shown in Table 1.

Example 3

To 1 kg of 1,1,1-tris(β-epithiopropylthiomethyl)-propane, 3 g of 2-diethylaminoethanol as the catalyst was mixed in a beaker and the mixture was stirred at the room temperature to form a homogeneous liquid. To the obtained liquid, 50 g of phenol and 50 g of cresol were added and mixed with the liquid homogeneously. The prepared mixture was left standing at 30° C. in an oven while the temperature of the mixture was kept being measured. The result are shown in Table 1.

Examples 4 to 9

The same procedures as those conducted in Example 2 were conducted except that compositions shown in Table 1 were used in place of 1 kg of 1,2-bis(β-epithiopropylthio) propane and substances shown in Table 1 were used in place of 50 g of phenol and 25 g of cresol. The results are shown in Table 1.

Comparative Example 1

To 1 kg of bis(β-methyl-β-epithiopropyl) ether, 3 g of 2-diethylaminoethanol as the catalyst was mixed in a beaker and the mixture was stirred at the room temperature to form a homogeneous liquid. The prepared liquid was left standing at 30° C. in an oven while the temperature of the liquid was kept being measured. After 20 hours, the liquid solidified rapidly and the obtained solid material was colored. The maximum increase in the temperature during the solidification was as large as 200° C. or more. The results are shown in Table 2.

Comparative Example 2

The same procedures as those conducted in Example 1 were conducted except that 75 g of toluene was used in place of 75 g of phenol.

The results are shown in Table 2.

TABLE 1

| | Composition (g) | added substance (g) | maximum increase in temperature (° C.) | time before solidification (day) | appearance after solidification |
|---|---|---|---|---|---|
| Example 1 | trimethylolpropane tris(β-epithiopropylthioacetate) = 1000<br>2-diethylaminoethanol = 3 | phenol = 75 | 5 | 4 | colorless |
| Example 2 | 1,1-bis(β-epithiopropylthio)-propane = 1000<br>2-diethylaminoethanol = 3 | phenol = 50<br>cresol = 25 | 6 | 3 | colorless |
| Example 3 | 1,1,1-tris(β-epithiopropyl-thiomethyl)propane = 1000<br>2-diethylaminoethanol = 3 | phenol = 50<br>cresol = 50 | 4 | 5 | colorless |
| Example 4 | bis(β-epithiopropyl)ether = 950<br>bis(2-mercaptoethyl-sulfide = 50<br>2-diethylaminoethanol = 3 | phenol = 50 | 6 | 4 | colorless |
| Example 5 | bis(β-epithiopropyl)sulfide = 1000<br>2-diethylaminoethanol = 3 | cresol = 50 | 5 | 4 | colorless |
| Example 6 | tetrakis(β-epithiopropylthio-methyl)methane = 1000<br>2-diethylaminoethanol = 3 | phenol = 50 | 5 | 4 | colorless |
| Example 7 | pentaerythritol tetrakis(β-epithiopropylthioacetate) = 900<br>bis(2-mercaptoethyl)sulfide = 50<br>2-hydroxyethyl methacrylate = 50<br>2-diethylaminoethanol = 3 | phenol = 70 | 4 | 3 | colorless |
| Example 8 | bis(β-epithiopropyl)sulfide = 900<br>bis(2-mercaptoethyl)sulfide = 50<br>3-phenoxy-2-hydroxypropyl acrylate = 50<br>2-diethylaminoethanol = 3 | phenol = 50<br>cresol = 25 | 5 | 4 | colorless |
| Example 9 | 1,2-bis(β-epithiopropylthio)-propane = 920<br>bis(2-mercaptoethyl)sulfide = 50<br>glycidol = 30<br>2-diethylaminoethanol = 3 | phenol = 50<br>cresol = 30 | 6 | 4 | colorless |

TABLE 2

| | Composition (g) | added substance (g) | maximum increase in temperature (° C.) | time before solidification (day) | appearance after solidification |
|---|---|---|---|---|---|
| Comparative Example 1 | trimethylolpropane tris(β-epithiopropylthioacetate) = 1000 2-diethylaminoethanol = 3 | none | >200 | 20 | brown |
| Comparative Example 2 | trimethylolpropane tris(β-epithiopropylthioacetate) = 1000 2-diethylaminoethanol = 3 | toluene = 75 | >200 | 22 | brown |

What is claimed is:

1. A process for treating a compound having epithio structures for disposal which comprises adding an acidic substance to a portion for disposal of a mixture comprising the compound and a catalyst for curing the compound and solidifying the portion, the portion being obtained in a process comprising casting and polymerizing the mixture to produce an optical material and the epithio structure being represented by following formula (1):

(1)

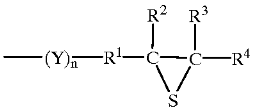

wherein $R^1$ represents a hydrocarbon group having 1 to 10 carbon atoms, $R^2$, $R^3$ and $R^4$ each represents hydrogen atom or a hydrocarbon group having 1 to 10 carbon atoms, Y represents S or O and n represents 0 or 1.

2. A process according to claim 1, wherein the acidic substance is an acidic organic compound.

3. A process according to claim 1, wherein the acidic substance is a compound having a phenolic hydroxyl group.

* * * * *